United States Patent
Chen et al.

(10) Patent No.: US 11,388,584 B2
(45) Date of Patent: Jul. 12, 2022

(54) SYSTEMS AND METHODS FOR DETERMINING ACTIVATION STATUS FOR USER DEVICES

(71) Applicant: Verizon Patent and Licensing Inc., Basking Ridge, NJ (US)

(72) Inventors: Zhengfang Chen, Millburn, NJ (US); Erdogan Topcu, Ashburn, VA (US); Musa Kazim Guven, Basking Ridge, NJ (US); Andrew E. Youtz, Princeton, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 21 days.

(21) Appl. No.: 16/901,563

(22) Filed: Jun. 15, 2020

(65) Prior Publication Data

US 2021/0392491 A1    Dec. 16, 2021

(51) Int. Cl.
*H04W 4/00*     (2018.01)
*H04W 8/22*     (2009.01)
*H04W 60/00*    (2009.01)

(52) U.S. Cl.
CPC ............. *H04W 8/22* (2013.01); *H04W 60/00* (2013.01)

(58) Field of Classification Search
None
See application file for complete search history.

(56) References Cited

U.S. PATENT DOCUMENTS

| | | | | |
|---|---|---|---|---|
| 8,588,850 | B1* | 11/2013 | Venkataramu | H04W 12/068 455/558 |
| 2012/0106443 | A1* | 5/2012 | Chen | H04W 48/16 370/328 |
| 2015/0181419 | A1* | 6/2015 | Mistry | H04W 8/18 455/419 |

* cited by examiner

*Primary Examiner* — Jinsong Hu
*Assistant Examiner* — Alexander J Yi

(57) ABSTRACT

A user device may provide, to a network, a first request to attach to the network and a second request for management and administrative services associated with the network. The user device may receive a first response indicating whether the first request is granted. The user device may receive, when the first response indicates that the first request is granted, a second response indicating whether the second request is granted. The user device may provide to the network, when the second response indicates that the second is granted, a third request for an activation status of the user device and may receive, from the network, a third response indicating the activation status. The user device may update, based on the third response, an activation flag indicating the activation status and may provide, for display, a message indicating the activation status of the user device based on the activation flag.

20 Claims, 9 Drawing Sheets

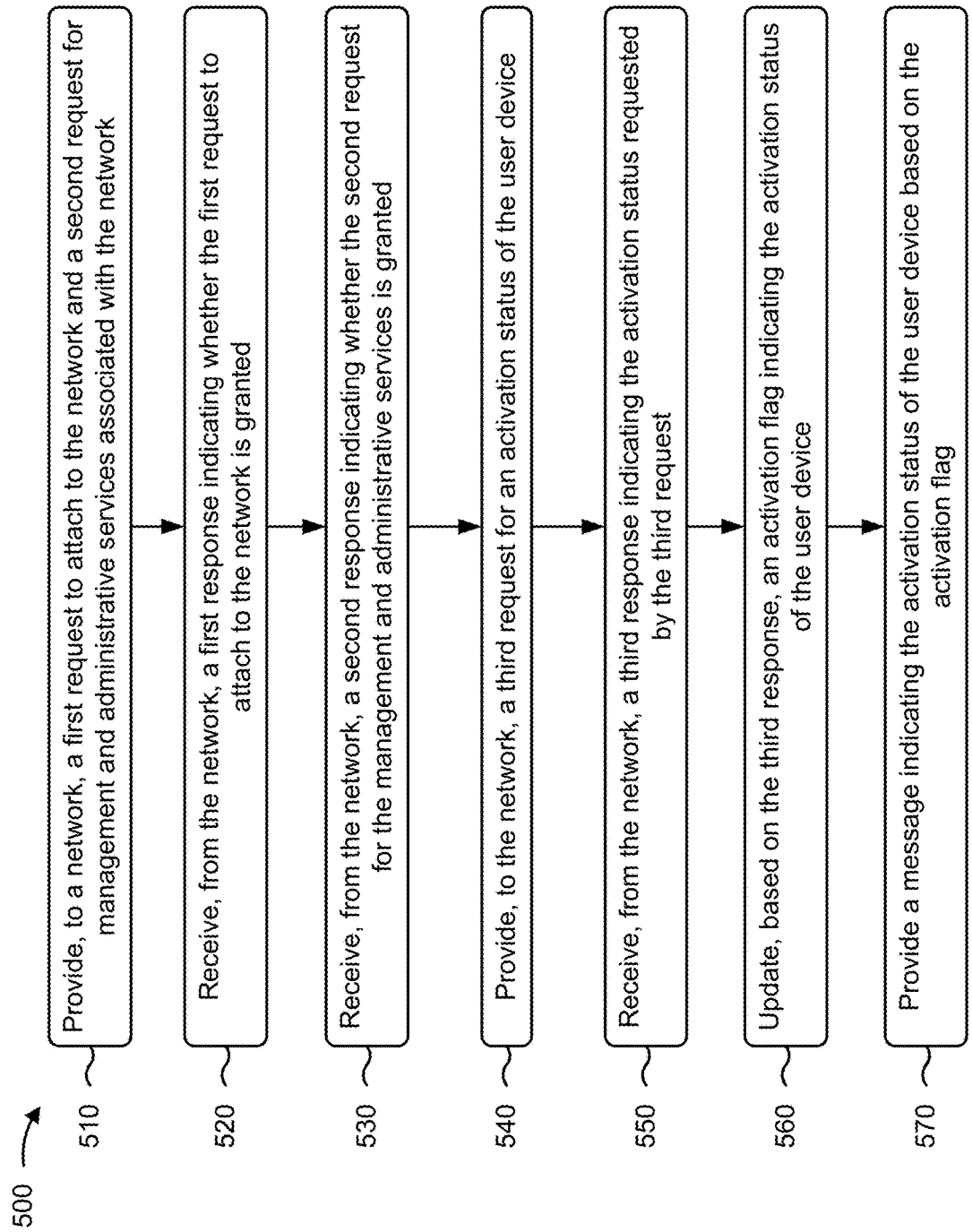

SYSTEMS AND METHODS FOR DETERMINING ACTIVATION STATUS FOR USER DEVICES

BACKGROUND

A user device may include a subscriber identity module (SIM) card. The SIM card is an integrated circuit that is capable of securely storing an international mobile subscriber identity (IMSI) and a related key. A user device and/or a SIM card may be activated to enable the user device to access a network.

BRIEF DESCRIPTION OF THE DRAWINGS

FIG. 5 is a flow chart of an example process relating to systems and methods for determining an activation status for a user device.

DETAILED DESCRIPTION OF PREFERRED EMBODIMENTS

Figure 1A:
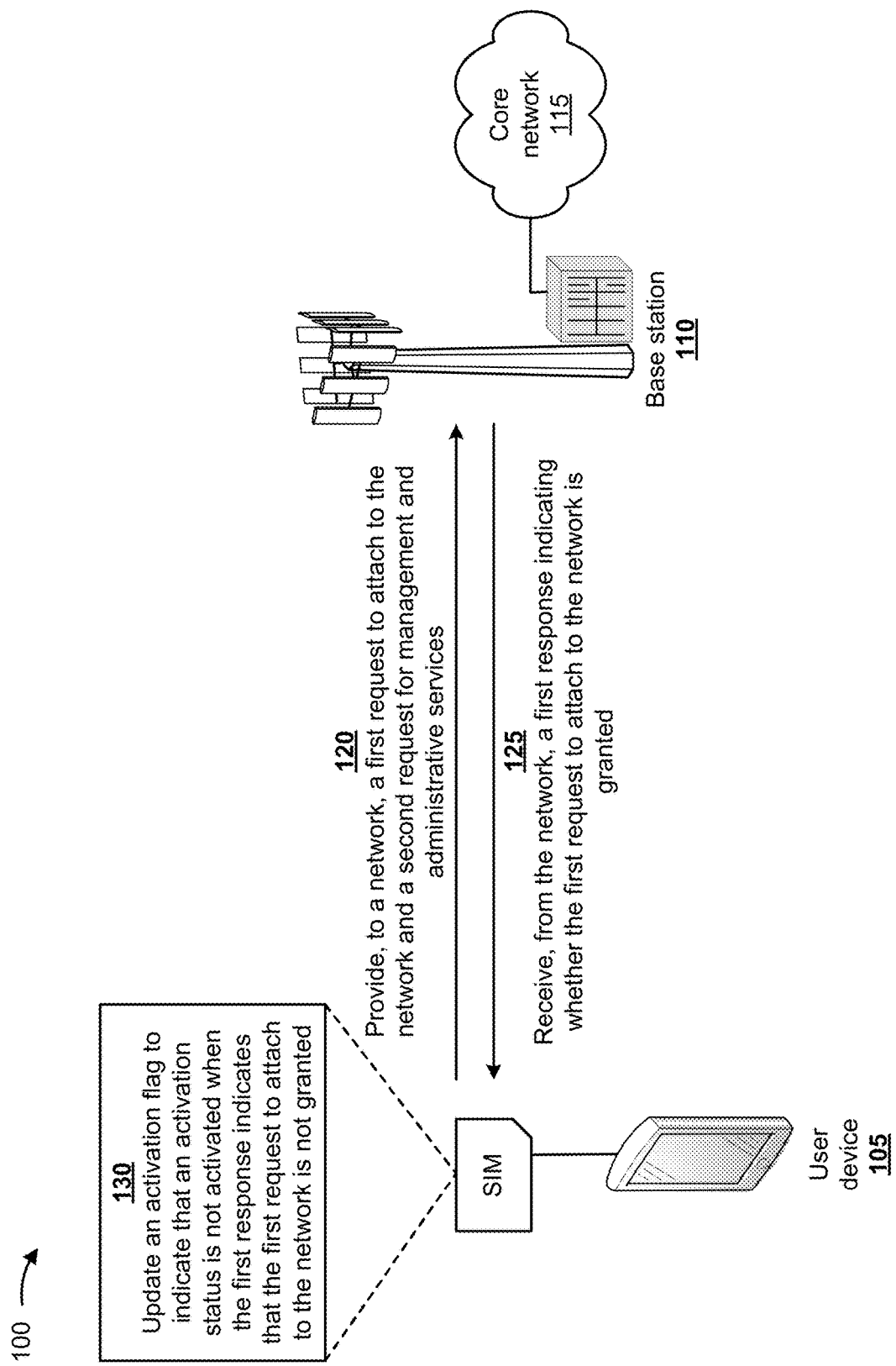
FIGS. 1A-1E are diagrams of an example implementation described herein.

The following detailed description of example implementations refers to the accompanying drawings. The same reference numbers in different drawings may identify the same or similar elements.

A user device may include a subscriber identity module (SIM) card. The SIM card may be a programmable SIM that is embedded directly into a user device. The programmable SIM can be remotely provisioned with a SIM profile that corresponds to an account or subscription that a user has with a service provider (e.g., a telecommunication provider, a mobile network operator (MNO), a carrier, and/or the like). The SIM can indicate an activation status associated with the account or subscription that the user has with the service provider.

A user device can determine an activation status of the user device and/or the SIM based on an activation flag that is included in the SIM (e.g., included in the SIM profile). The activation flag may be updated while the user device and/or the SIM is subscribed with a service provider (e.g., subscribed with a cellular service provided by the service provider). For example, the activation flag may indicate that the user device and/or the SIM is activated, not activated, and/or the like. However, when a user associated with the user device unsubscribes with the service provider, the activation flag of the SIM may indicate the activation status of the user device and/or the SIM prior to the user unsubscribing with the service provider (e.g., as the activation flag will not be updated after the user device is unsubscribed from the cellular service provided by the service provider). As a result, the activation flag may continue to indicate that the user device and/or the SIM is activated after the user device is unsubscribed with the service provider (e.g., after the user device and/or the SIM is no longer activated). This may cause the user device to determine a wrong activation status of the user device and/or the SIM when using the activation flag of the SIM to determine the activation status.

A user device can determine an activation status of the user device and/or the SIM based on a mobile directory number (MDN) identified in a code division multiple access (CDMA) SIM (CSIM) that is included in the SIM (e.g., included in the SIM profile). The user device may use the MDN to identify the user device and determine an activation status associated with the user device and/or the SIM. However, when a SIM is deactivated and reactivated with a new MDN, the CSIM may indicate a wrong MDN (e.g., the CSIM may indicate a previous MDN). As a result, the user device may determine a wrong activation status of the user device and/or the SIM when using the MDN indicated in the CSIM. Additionally, some user devices, such as 5G user devices, may not include CDMA technology. As a result, the SIM profile of the user device may not include a CSIM. Therefore, the user device may not be able to use the MDN indicated in the CSIM to determine the activation status of the user device and/or the SIM.

A user device can determine an activation status of the user device and/or the SIM using a non-access stratum (NAS) protocol configuration option (PCO) signaling message to determine whether a valid mobile subscriber integrated services digital network (MSISDN) number is identified in the SIM (e.g., in the SIM profile). The MSISDN may be provided by the service provider to the user device and/or the SIM. The MSISDN may map a telephone number of the user device to the SIM of the user device in the network of the service provider and may be used to identify activated user devices and/or activated SIMs within the network of the service provider. However, some user devices, such as machine-to-machine (M2M) user devices, Internet of things (IoT) user devices, and/or the like, may not be associated with an MSISDN for cellular service. Additionally, some user devices may not support a particular PCO function (e.g., some user devices may not support interpreting a MSISDN field of a PCO message and/or the like). As a result, some user devices may be unable to use the NAS PCO signaling message and/or unable to use a MSISDN to determine an activation status of the user device and/or the SIM.

Some implementations described herein enable a user device to determine a real-time activation status of the user device and/or of a SIM of the user device using information stored by the network (e.g., by a SIM over-the-air (OTA) device of the network, and/or the like). For example, the user device may request an activation status of the user device from the network (e.g., at an initial power up of the user device, when a SIM of the user device is changed, and/or the like). The user device may update an activation flag included in a SIM profile of the SIM based on the response to the request for the activation status. This may enable the user device to use the SIM functionality, such as a SIM application of the SIM profile, to determine a real-time up to date activation status of the user device from the network. Therefore, the user device may not rely on local information stored in the SIM profile and/or the user device to determine the activation status of the user device. This may result in a more reliable determination of the activation status, as the location information may not be up to date. Moreover, the user device may be enabled to determine the activation status of the user device using the activation flag included in the SIM profile. As a result, user devices that may not support certain functionality, such as CDMA functionality, MSISDN functionality, PCO functionality, and/or the like, may be enabled to determine the activation status of the user device using existing functionality included in the SIM profile (e.g., the activation flag). This may result in a determination of the activation status that is applicable regardless of a type of radio access technology (RAT) associated with the user device, a capability of the user device, and/or the like. Moreover, as the determination of the activation status is based on information provided by the network (e.g., by the service provider associated with the network), the determination of the activation status may be performed in real-time and in a more reliable manner.

FIGS. 1A-1E are diagrams of an example 100 associated with systems and methods for determining an activation status for user devices. As shown in FIGS. 1A-1E, example 100 includes a user device 105 and a base station 110. The base station 110 may be associated with a core network 115 of a network (e.g., a fourth generation (4G) network, a fifth generation (5G) network, and/or the like). The user device 105 and the base station 110 may communicate using a cellular radio access technology (RAT) (e.g., a 4G RAT, a 5G RAT, and/or the like).

The user device 105 may be a 4G device, a 5G device, and/or the like. For example, the user device 105 may be a mobile telephone, a machine-to-machine (M2M) device, an Internet of things (IoT) device, and/or the like. In some implementations, the user device 105 may be incapable of communicating with an Internet protocol multimedia subsystem (IMS). In some implementations, the user device 105 may be unassociated with a mobile subscriber integrated services digital network (MSISDN) number (e.g., may be a device that does not use an MSISDN for cellular live service). As described herein, one or more (or all) functions described as being performed by the user device 105 may be performed by a SIM of the user device 105. Similarly, one or more (or all) functions described as being performed by the SIM of the user device 105 may be performed by the user device 105.

As shown in FIG. 1A, and by reference number 120, the SIM of the user device 105 may provide, to the network (e.g., to the base station 110 and/or the like) a first request to attach to the network. For example, the SIM of the user device 105 may determine a service provider and/or a network (e.g., associated with the service provider) based on information identified in a SIM profile of the SIM of the user device 105. The SIM of the user device 105 may provide an attach request to the network to enable the user device to connect to and/or access the network.

The SIM of the user device 105 may provide the first request when the user device is initially powered on and/or when a SIM of the user device 105 is changed. For example, the user device 105 may determine that the user device 105 is initially powering up or that a SIM of the device is changed. The SIM of the user device 105 may provide the first request to attach to the network based on determining that the user device 105 is initially powering up or that the SIM of the user device 105 is changed.

The SIM of the user device 105 may provide, to the network, a second request for management and administrative services provided by the network. In some implementations, the SIM of the user device 105 may provide the second request at the same time that the SIM of the user device 105 provides the first request to attach to the network. In some implementations, the SIM of the user device 105 may provide the second request at a different time than the SIM of the user device 105 provides the first request to attach to the network. When the user device 105 is a 4G device, the second request may include an administrative packet data network request (e.g., an administrative access point name (APN) request and/or the like). When the user device 105 is a 5G device (e.g., a standalone 5G device and/or the like), the second request may include an administrative data network name (DNN) request. If the 5G device determines that the device is not within a 5G network coverage area, the 5G device may request to attach to a 4G network (e.g., as described above in connection with reference number 120) followed by an APN request. The APN and/or the DNN may identify the network. The second request for management and administrative services may enable the user device 105 to establish a session (e.g., a data session and/or the like) with the network.

As shown by reference number 125, the SIM of the user device 105 may receive, from the network, a first response indicating whether the first request to attach to the network is granted. The network (e.g., the base station 110, the core network 115, and/or the like) may receive the first request, authenticate the user device 105 and/or the SIM of the user device 105, and/or determine whether the user device 105 is permitted to attach to the network. The network may determine whether to grant the first request to attach to the network based on an identifier associated with the user device 105, based on information identified in the SIM profile of the SIM of the user device 105, and/or the like. If the first response indicates that the first request to attach to the network is granted, the user device 105 may attach to and/or connect to the network. In some implementations, the SIM of the user device 105 may provide the second request for management and administrative services based on the first response indicating that the first request to attach to the network is granted.

As shown by reference number 130, the SIM of the user device 105 may update an activation flag to indicate that an activation status is not active when the first response indicates that the first request to attach to the network is not granted. For example, the SIM of the user device 105 may determine, based on the first response indicating that the first request to attach to the network is not granted, that the user device 105 and/or the SIM of the user device 105 are not activated. The activation flag may be included in the SIM profile of the SIM of the user device 105. The SIM of the user device 105 may be a programmable SIM such that the SIM of the user device 105 is capable of updating the activation flag to indicate the activation status of the SIM and/or of the user device 105.

Figure 1B:
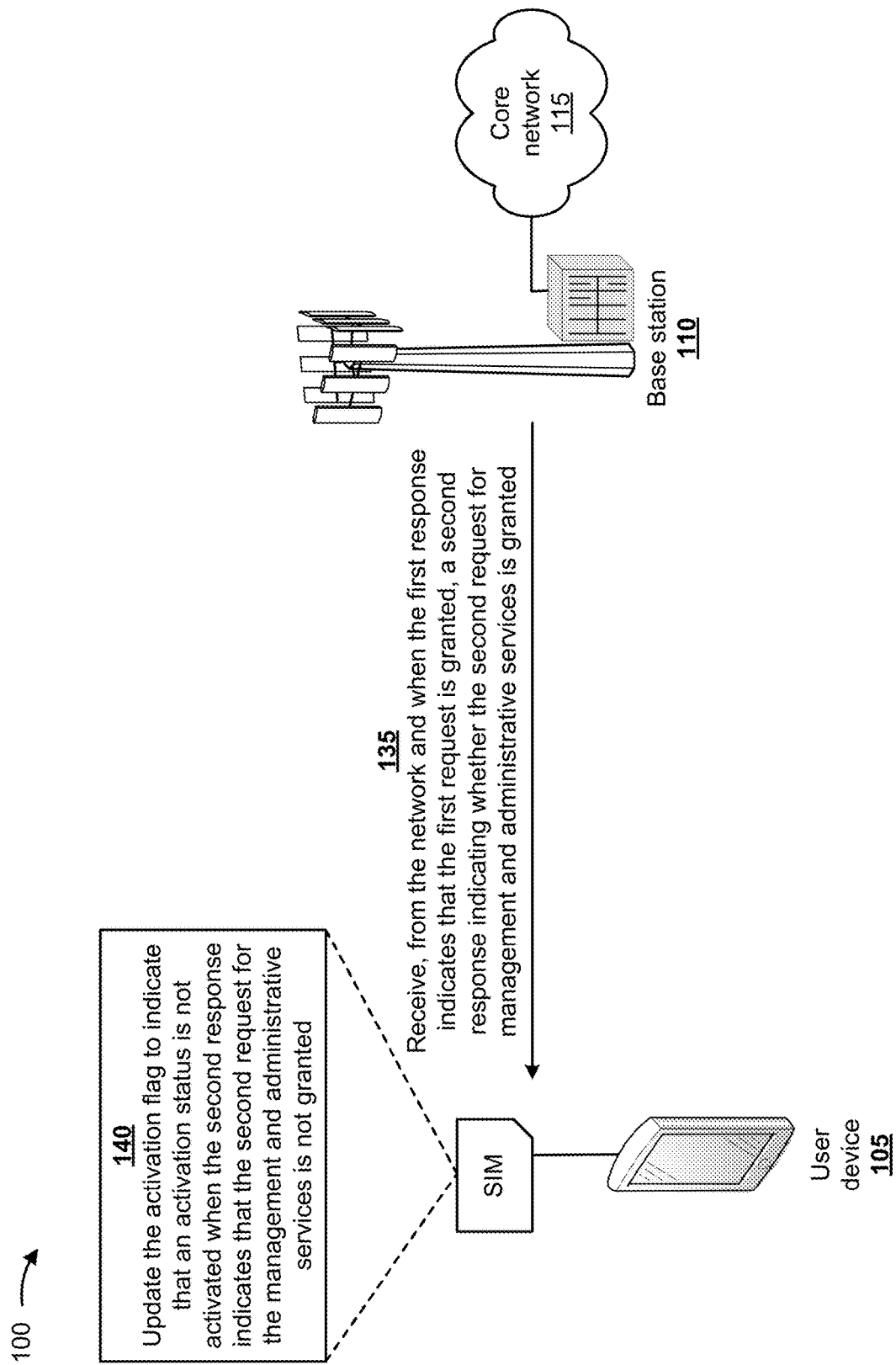

As shown in FIG. 1B, and by reference number 135, the SIM of the user device 105 may receive from the network, when the first response indicates that the first request to attach to the network is granted, a second response indicating whether the second request for management and administrative services (e.g., the administrative APN request, the administrative DNN request, and/or the like) is granted. The network (e.g., the base station 110, the core network 115, and/or the like) may determine whether to grant the second request for management and administrative services based on the identifier associated with the user device 105, information identified in the SIM profile of the SIM of the user device 105, and/or the like. If the second response indicates that the second request for management and administrative services is granted, the user device 105 may proceed with establishing a session (e.g., a data session) on the network using the management and administrative services provided by the network. For example, the network may provide an APN and/or a DNN to the user device 105. The user device 105 may provide the APN and/or the DNN to the network when establishing the session to enable the network to determine what type of network connection should be established (e.g., an IP address to assign to the user device 105, one or more security techniques to use for the session, and/or the like).

As shown by reference number 140, the SIM of the user device 105 may update the activation flag to indicate that an activation status of the user device 105 and/or the SIM of the user device 105 is not activated, when the second response indicates that the second request for the management and administrative services is not granted. For example, the SIM of the user device 105 may determine that the user device 105 and/or the SIM of the user device 105 is not activated based on the user device 105 and/or the SIM of the user device 105 receiving the second response indicating that the request for the management and administrative services is not granted. The second response indicating that the request for the management and administrative services is not granted may indicate that the SIM of the user device 105 is not valid, not subscribed with a service provider associated with the network, not activated with a service provider associated with the network, and/or the like.

Figure 1C:
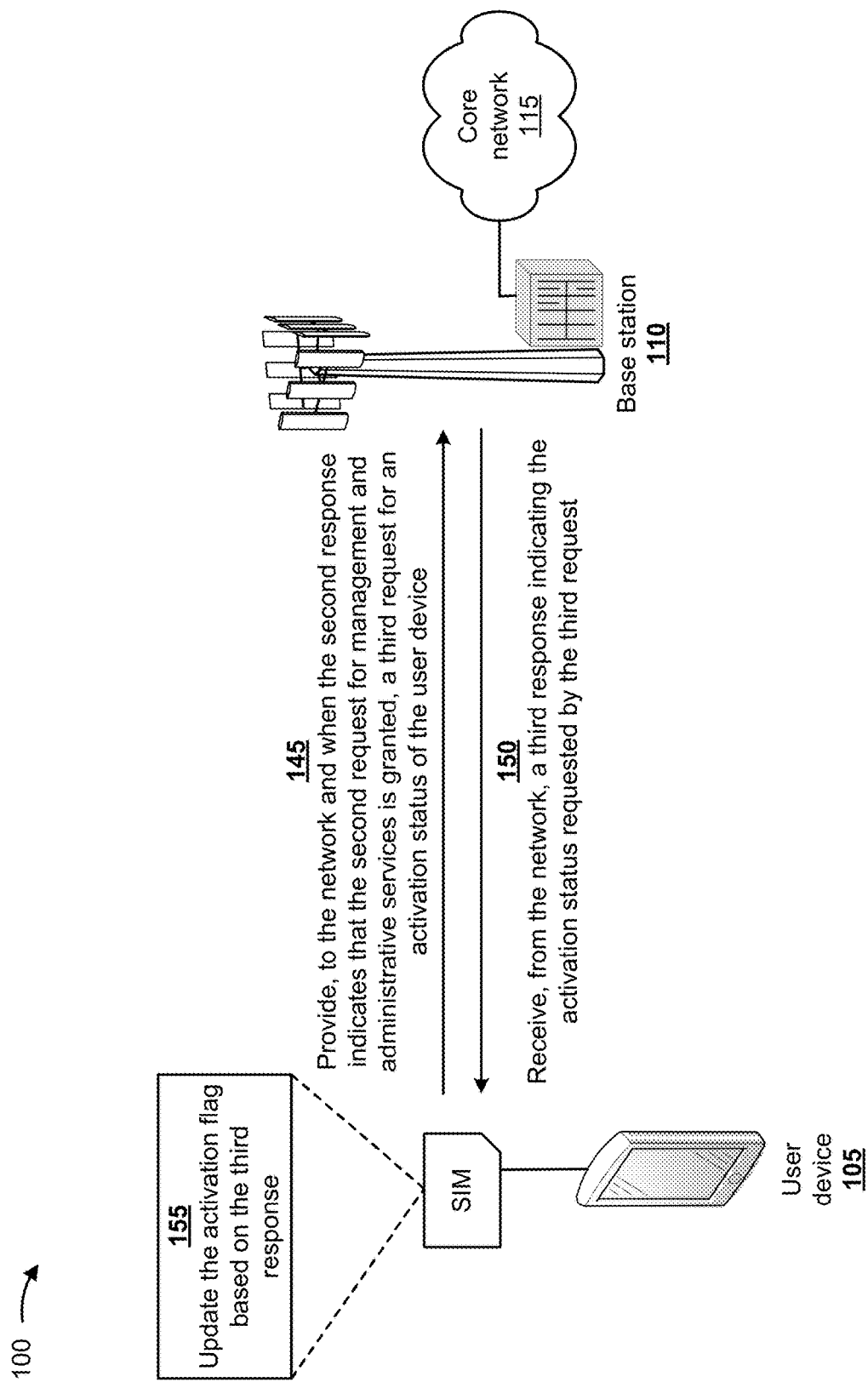

As shown in FIG. 1C, and by reference number 145, the SIM of the user device 105 may provide to the network, when the second response indicates that the second request for management and administrative services is granted, a third request for an activation status of the user device 105 and/or of the SIM of the user device 105. The third request may be provided to a SIM over-the-air (OTA) device of the network (e.g., a SIM application of the SIM of the user device 105 may provide the third request for an activation status of the user device 105 to a SIM OTA device of the network). The SIM of the user device 105 may provide the third request to the SIM OTA device via the administrative APN (e.g., for a 4G device or a 5G device connected to a 4G network) or via the administrative DNN (e.g., for a 5G device). The SIM OTA device may be a device that securely updates and manages SIM information for the network. For example, the SIM OTA device may communicate with the SIM of the user device 105, download or install applications to the SIM of the user device 105, and/or manage the SIM of the user device 105 without being physically connected to the SIM card. The SIM OTA device may store an activation status associated with the SIM of the user device 105 (and/or one or more other SIMs associated with the network). The activation status stored by the SIM OTA device may be a real-time activation status and may be updated by the SIM OTA device based on a SIM and/or a user device 105 subscribing and/or unsubscribing with a service provider associated with the network. In some implementations, the SIM OTA device may be included in the core network 115.

In some implementations, the SIM of the user device 105 may not provide the third request for an activation status of the user device 105 when the second response indicates that the second request for management and administrative services is granted. For example, if the SIM of the user device 105 is incapable of communicating with the SIM OTA device, the SIM of the user device 105 may not provide the third request for an activation status of the user device 105 (e.g., the SIM of the user device 105 may be prevented from providing the third request to the network). For example, the user device 105 may be a reduced capability device, an IoT device, an M2M device, and/or the like that is not capable of communicating with the SIM OTA device. A user device 105 that is not capable of communicating with the SIM OTA device may not require a SIM of the user device 105 to be programmed in order to operate on a network of a service provider. In that case, the SIM of the user device 105 may use the first response and the second response (e.g., and not a third response to the third request) to update the activation flag of the SIM.

As shown by reference number 150, the SIM of the user device 105 may receive, from the network (e.g., from the base station 110, the core network 115, the SIM OTA device, and/or the like), a third response indicating the activation status requested by the third request. The third response may indicate that the activation status of the user device 105 and/or of the SIM of the user device 105 is not activated, in progress, or activated. The network may determine the activation status of the user device 105 and/or of the SIM of the user device 105 based on information stored by the network (e.g., information stored by the SIM OTA device and/or the like).

As shown by reference number 155, the SIM of the user device 105 may update the activation flag based on the third response. For example, if the third response indicates that the activation status of the user device 105 and/or of the SIM of the user device 105 is activated, the SIM of the user device 105 may update the activation flag to indicate that the activation status is activated. Similarly, if the third response indicates that the activation status of the user device 105 and/or of the SIM of the user device 105 is not activated, the SIM of the user device 105 may update the activation flag to indicate that the activation status is not activated.

A third response indicating that the activation status of the user device 105 and/or of the SIM of the user device 105 is in progress may indicate that the network is in the process of programming the SIM and/or the SIM profile of the SIM of the user device 105. For example, the SIM OTA device may need to program the SIM and/or the SIM profile with information before the SIM is activated. The SIM OTA device may program the SIM and/or the SIM profile with a mobile directory number (MDN) identified in a code division multiple access (CDMA) SIM (CSIM) that is included in the SIM (e.g., included in the SIM profile) for user devices with CDMA technology (e.g., 4G devices and/or the like), with a mobile subscriber integrated services digital network (MSISDN) number, with a telephone number, with a preferred mobile network list (e.g., a preferred roaming list, a public land mobile network (PLMN) list, and/or the like), and/or the like. During this time (e.g., while the SIM OTA is programming the SIM and/or the SIM profile), the activation status of the user device 105 and/or the SIM of the user device 105 may be in progress. For example, a voice-capable user device 105 may require the MDN, MSISDN, telephone number, and/or the like for certain functions (e.g., voice calls, video calls, messaging, and/or the like). As a result, the user device 105 must wait for the programming of the SIM and/or the SIM profile before the user device 105 and/or the SIM of the user device 105 is activated.

Figure 1D:
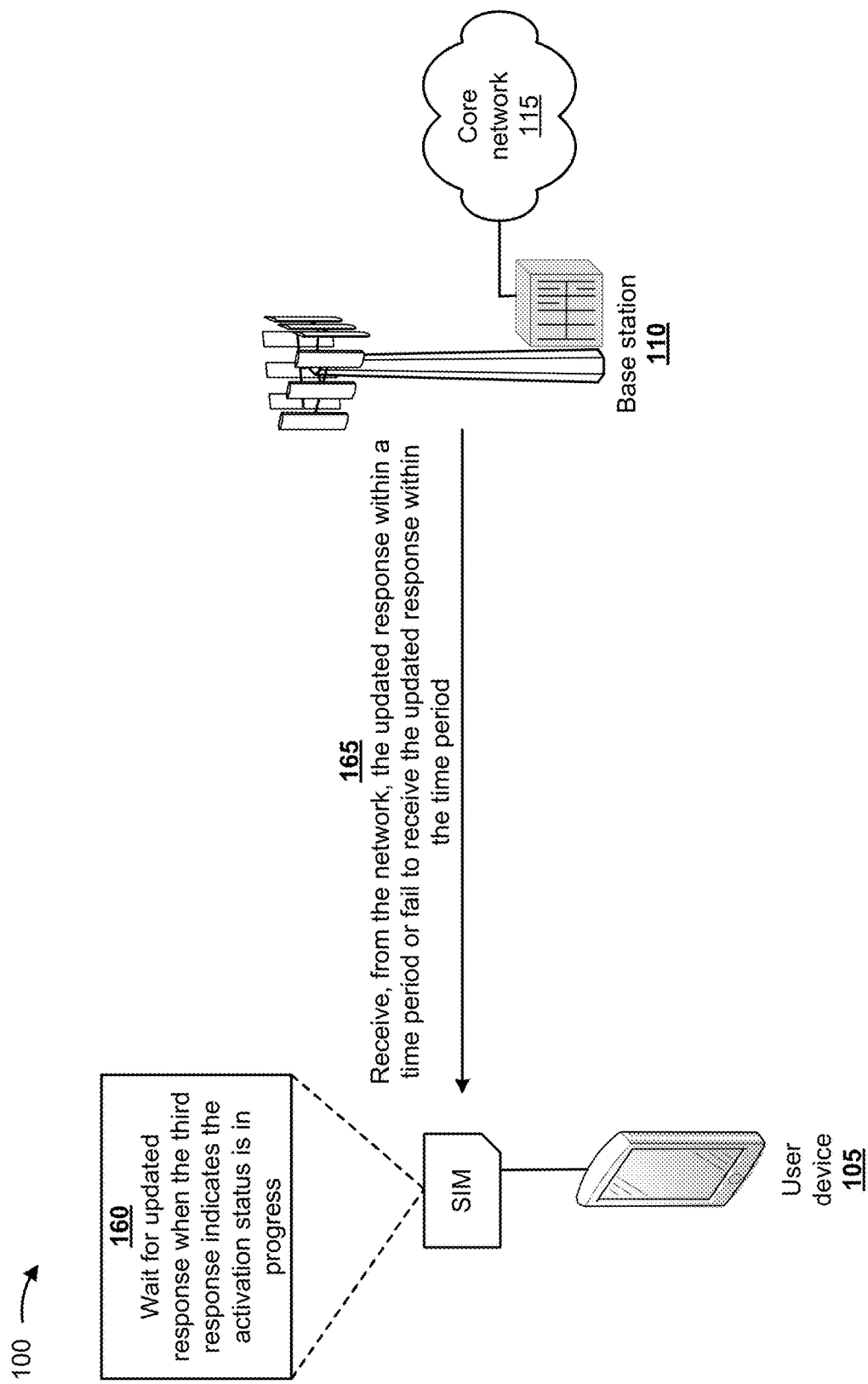

As shown in FIG. 1D, and by reference number 160, the SIM of the user device 105 may wait for an updated response when the third response indicates that the activation status is in progress. The SIM of the user device 105 may update the activation flag to indicate that the activation status is in progress. The SIM of the user device 105 may initiate a timer based on receiving the third response indicating that the activation status is in progress. The timer may be associated with a time period (e.g., an amount of time) that the SIM of the user device 105 is to wait for the updated response.

As shown by reference number 165, the SIM of the user device may receive from the network (e.g., from the base station 110, the SIM OTA device, and/or the like), the updated response within the time period or fail to receive the updated response within the time period. The updated response may indicate that the activation status is activated or not activated. In some implementations, failing to receive the updated response within the time period may indicate that the activation status is not activated, that an error in programing the SIM and/or the SIM profile has occurred, and/or the like. In some implementations, the updated response may indicate that programming of the SIM of the user device 105 has been completed. The SIM of the user device 105 may determine that the activation status of the user device 105 and/or of the SIM is activated based on receiving the updated response indicating that the programming of the SIM of the user device 105 has been completed.

Figure 1E:
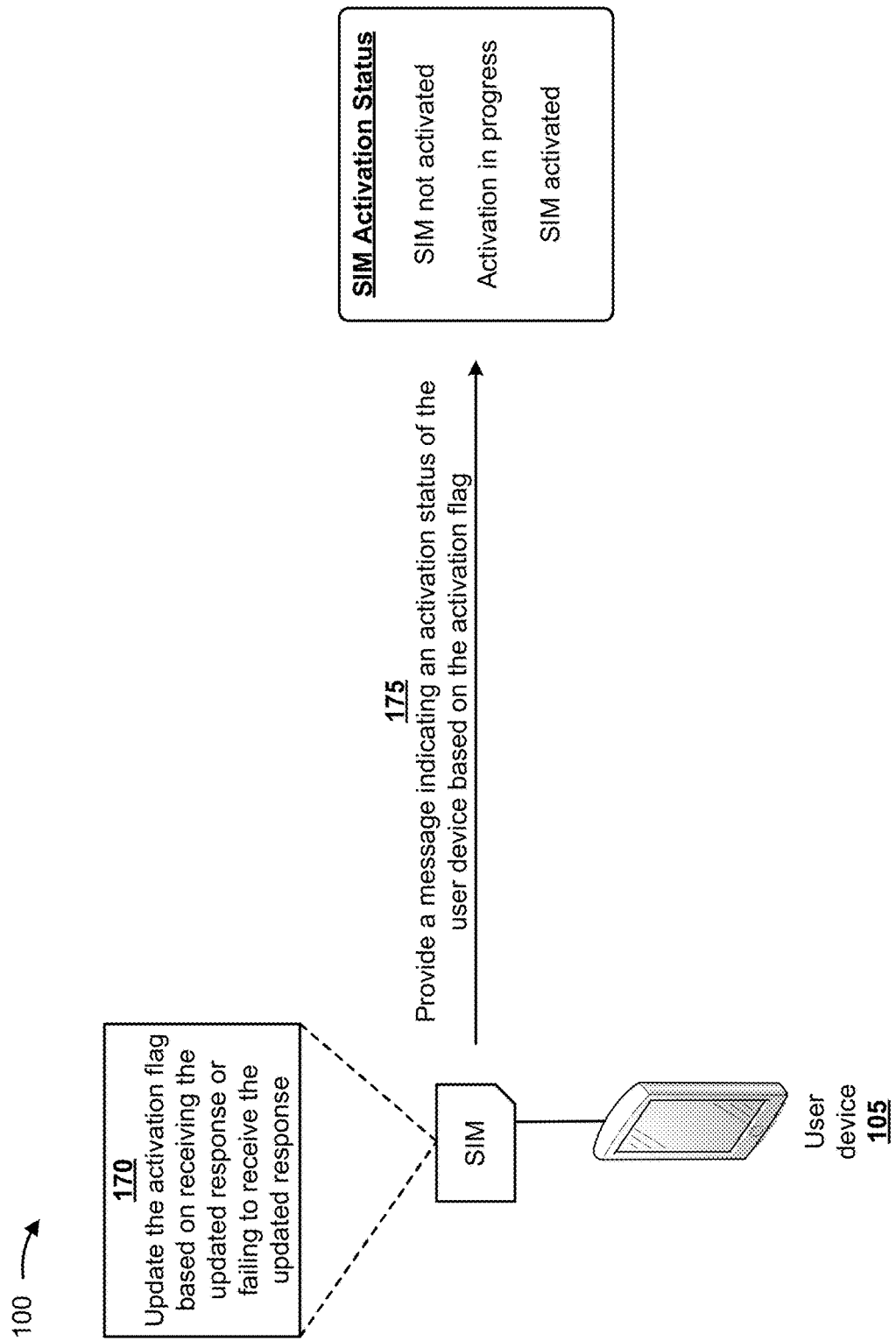

As shown in FIG. 1E, and by reference number 170, the SIM of the user device 105 may update the activation flag based on receiving the updated response or failing to receive the updated response within the time period. For example, the SIM of the user device 105 may determine whether the updated response is received from the network prior to expiration of the time period (e.g., prior to the expiration of the timer initiated when the third response indicating that the activation status is in progress was received). The SIM of the user device 105 may selectively (e.g., based on determining whether the updated response is received from the network prior to expiration of the time period) update the activation flag based on the updated response when the updated response is received from the network prior to the expiration of the time period, or update the activation flag to indicate that the user device 105 and/or the SIM of the user device 105 is not activated when the updated response is not received from the network prior to the expiration of the time period. In some implementations, if the SIM of the user device 105 determines that the updated response is not received from the network prior to the expiration of the time period, the SIM of the user device 105 may provide a request, to the network (e.g., to the SIM OTA device and/or the like), to reactivate and/or reprogram the SIM of the user device 105.

As shown by reference number 175, the SIM of the user device 105 may provide, for display, a message indicating an activation status of the user device 105 based on the activation flag. For example, the SIM of the user device 105 may provide a command to the user device 105 for the user device 105 to read the activation flag to determine the activation status of the user device 105 and/or of the SIM of the user device 105. The user device 105 may read the activation flag and may determine the activation status of the user device 105 and/or of the SIM of the user device 105 based on reading the activation flag. In some implementations, the user device may read the activation flag after a predetermined amount of time to allow the SIM OTA device to update. The user device 105 may generate a message indicating the activation status of the user device 105 based on reading the activation flag. The user device 105 may provide the message indicating the activation status of the device based on generating the message. The user device 105 may display (e.g., on a user interface of the user device 105 and/or the like) the activation status. For example, the user device 105 may display that the activation status of the user device 105 and/or of the SIM of the user device 105 is activated, not activated, or in progress. In some implementations, when the activation status is activated, the user device 105 may display a phone number associated with the SIM and/or the SIM profile.

In some implementations, the user device 105 may not display the activation status of the user device 105 and/or of the SIM of the user device 105 (e.g., if the user device 105 does not have a user interface and/or the like). The user device 105 may perform an action or refrain from performing an action based on determining the activation status (e.g., based on reading the activation flag). For example, if the user device 105 reads the activation flag and determines that the activation status is activated, the user device 105 may enter a sleep mode (e.g., a reduced power mode, a power saving mode, and/or the like), may transmit a message to one or more other devices, and/or the like. Alternatively, if the user device 105 reads the activation flag and determines that the activation status is not activated, the user device 105 may refrain from entering a sleep mode, may transmit a message to one or more other devices indicating that the user device 105 and/or the SIM of the user device 105 is not activated, may display instructions to a user of the user device 105 indicating how to subscribe to a network service or how to activate the SIM of the user device 105, and/or the like.

As a result, the SIM of the user device 105 may update an activation flag included in a SIM profile of the SIM based on the response to the request for the activation status. This may enable the user device 105 to use the SIM functionality, such as a SIM application of the SIM profile, to determine a real-time up to date activation status of the user device 105 from the network. Therefore, the user device 105 may not rely on local information stored in the SIM profile and/or the user device 105 to determine the activation status of the user device. This may result in a more reliable determination of the activation status as the location information may not be up to date. Moreover, the user device 105 may be enabled to determine the activation status of the user device 105 using the activation flag included in the SIM profile. As a result, user devices that may not support certain functionality, such as CDMA functionality, MSISDN functionality, PCO functionality, and/or the like, may be enabled to determine the activation status of the user device using existing functionality included in the SIM profile (e.g., the activation flag). This may result in a determination of the activation status that is applicable regardless of a type of radio access technology (RAT) associated with the user device, a capability of the user device, and/or the like. Moreover, as the determination of the activation status is based on information provided by the network (e.g., by the service provider associated with the network), the determination of the activation status may be performed in real-time and in a more reliable manner.

As indicated above, FIGS. 1A-1E are provided as an example. Other examples may differ from what is described with regard to FIGS. 1A-1E. The number and arrangement of devices shown in FIGS. 1A-1E are provided as an example. In practice, there may be additional devices, fewer devices, different devices, or differently arranged devices than those shown in FIGS. 1A-1E. Furthermore, two or more devices shown in FIGS. 1A-1E may be implemented within a single device, or a single device shown in FIGS. 1A-1E may be implemented as multiple, distributed devices. Additionally, or alternatively, a set of devices (e.g., one or more devices) shown in FIGS. 1A-1E may perform one or more functions described as being performed by another set of devices shown in FIGS. 1A-1E.

Figure 2:
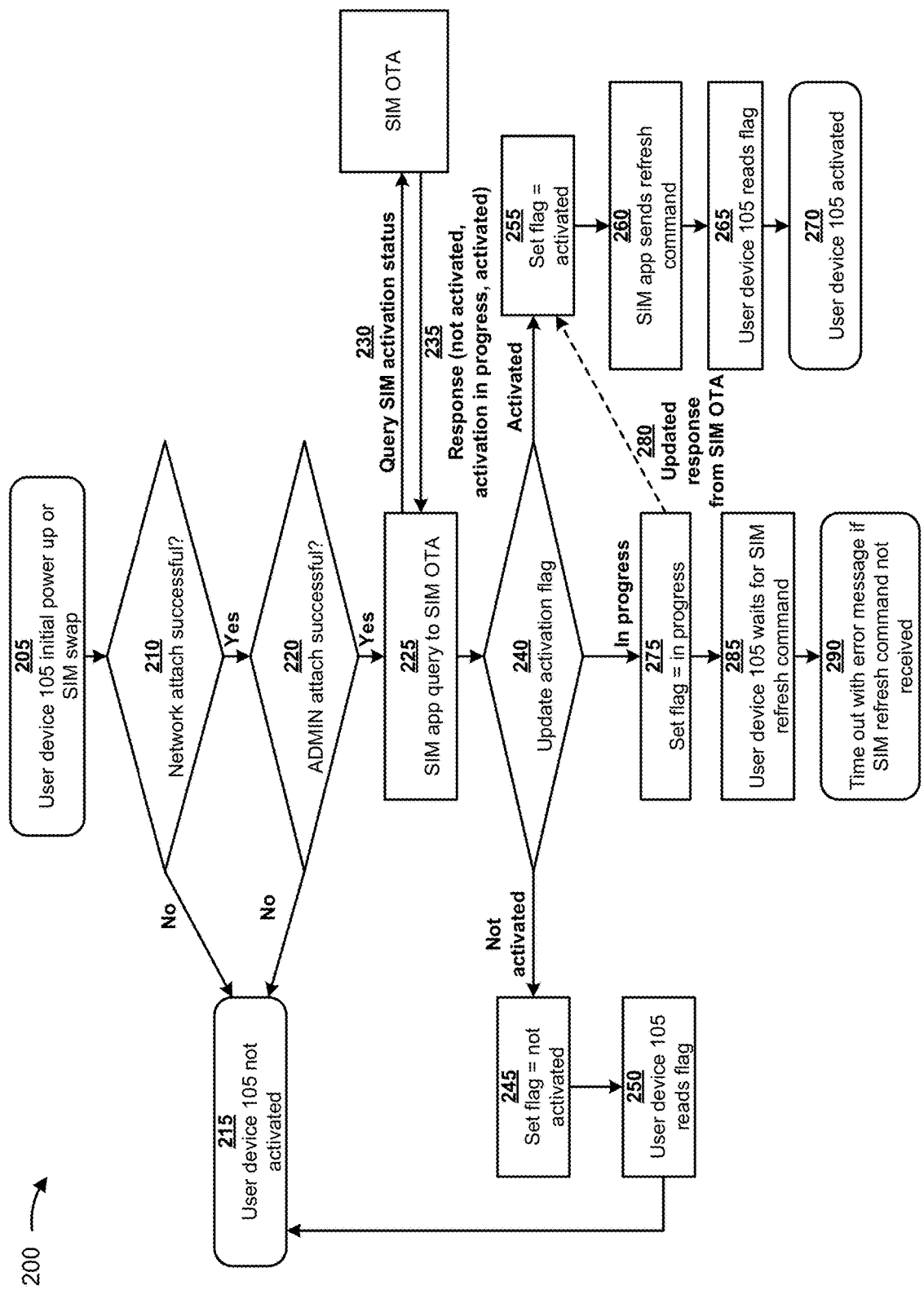
FIG. 2 is a diagram of an example implementation described herein.

FIG. 2 is a diagram of an example 200 associated with systems and methods for determining an activation status for user devices. Example 200 shows a flow chart of an example process associated with systems and methods for determining an activation status for user devices. Blocks of example 200 may be performed by the user device 105, by the SIM of the user device 105, by the network (e.g., by base station 110, by a SIM OTA device of the network, and/or the like), and/or the like.

As shown by reference number 205, example 200 may be initiated based on user device 105 initially powering up and/or based on a SIM of user device 105 being changed. As shown by reference number 210, the user device 105 and/or the SIM of the user device 105 may determine whether a network attach procedure is successful. For example, the SIM of the user device 105 may transmit a request to attach to the network, and the network may transmit a response indicating whether the request to attach to the network is granted (e.g., as described above in connection with FIGS. 1A-1E).

As shown by reference number 215, if the network attach procedure is not successful, the user device 105 may determine that the user device 105 and/or the SIM of the user device 105 is not activated. As shown by reference number 220, if the network attach procedure is successful, the user device 105 and/or the SIM of the user device 105 may determine whether an administrative attach procedure is successful. For example, the SIM of the user device 105 may transmit a request for management and administrative services from the network. The network may respond to the request indicating whether the request for management and administrative services is granted (e.g., as described above in connection with FIGS. 1A-1E).

As further shown by reference number 215, if the administrative attach procedure is not successful, the user device 105 may determine that the user device 105 and/or the SIM of the user device 105 is not activated. As shown by reference number 225, if the administrative attach procedure is successful, the SIM of the user device 105 (e.g., a SIM application of the SIM of the user device 105) may query a SIM OTA device of the network to request an activation status of the user device 105 and/or of the SIM of the user device 105. For example, as shown by reference number 230, the SIM application may query the SIM OTA device for the activation status of the user device 105 and/or of the SIM of the user device 105. As shown by reference number 235, the SIM OTA device may respond to the SIM of the user device 105 indicating that the activation status is not activated, activation in progress, or activated (e.g., as described above in connection with FIGS. 1A-1E).

As shown by reference number 240, the SIM of the user device 105 may update an activation flag included in a SIM profile of the SIM of the user device 105 based on the response from the SIM OTA device. For example, as shown by reference number 245, if the response indicates that the activation status is not activated, the SIM of the user device 105 may set the activation flag to indicate that the activation status is not activated. As shown by reference number 250, the user device 105 may read the activation flag (e.g., based on a command received from the SIM of the user device 105 and/or the like). As further shown by reference number 215, the user device 105 may determine that the activation status of the user device 105 and/or of the SIM of the user device 105 is not activated based on reading the activation flag.

As shown by reference number 255, if the response indicates that the activation status is activated, the SIM of the user device 105 may set the activation flag to indicate that the activation status is activated. As shown by reference number 260, the SIM of the user device 105 may send a refresh command to the user device 105 indicating that the activation status has been refreshed or changed. As shown by reference number 265, the user device 105 may read the activation flag based on receiving the refresh command from the SIM of the user device 105. As shown by reference number 270, the user device 105 may determine that the activation status of the user device 105 and/or of the SIM of the user device 105 is activated based on reading the activation flag.

As shown by reference number 275, if the response indicates that the activation status is in progress, the SIM of the user device 105 may set the activation flag to indicate that the activation status is in progress. In some implementations, the user device 105 and/or the SIM of the user device 105 may initiate a timer based on setting the activation flag to indicate that the activation status is in progress. As shown by reference number 280, after setting the activation flag to indicate that the activation status is in progress, the SIM of the user device 105 may receive an updated response from the SIM OTA indicating that the activation status is activated. The SIM of the user device 105 may set the activation flag to indicate that the activation status is activated based on receiving the updated response. The SIM of the user device 105 may then send the refresh command, and the user device 105 may read the activation flag and determine that the activation status is activated (e.g., as described above in connection with reference numbers 260, 265, and 270). As shown by reference number 285, after setting the activation flag to indicate that the activation status is in progress, the user device 105 may wait (e.g., until the timer expires) for the refresh command from the SIM of the user device 105. As shown by reference number 290, if the timer expires before the user device 105 receives a refresh command, the user device 105 may provide a timeout error message (e.g., indicating that the SIM of the user device 105 was not activated within the amount of time associated with the timer).

As indicated above, FIG. 2 is provided as an example. Other examples may differ from what is described with regard to FIG. 2. Although FIG. 2 shows example blocks of example 200, in some implementations, example 200 may include additional blocks, fewer blocks, different blocks, or differently arranged blocks than those depicted in FIG. 2. Additionally, or alternatively, two or more of the blocks of example 200 may be performed in parallel.

Figure 3:
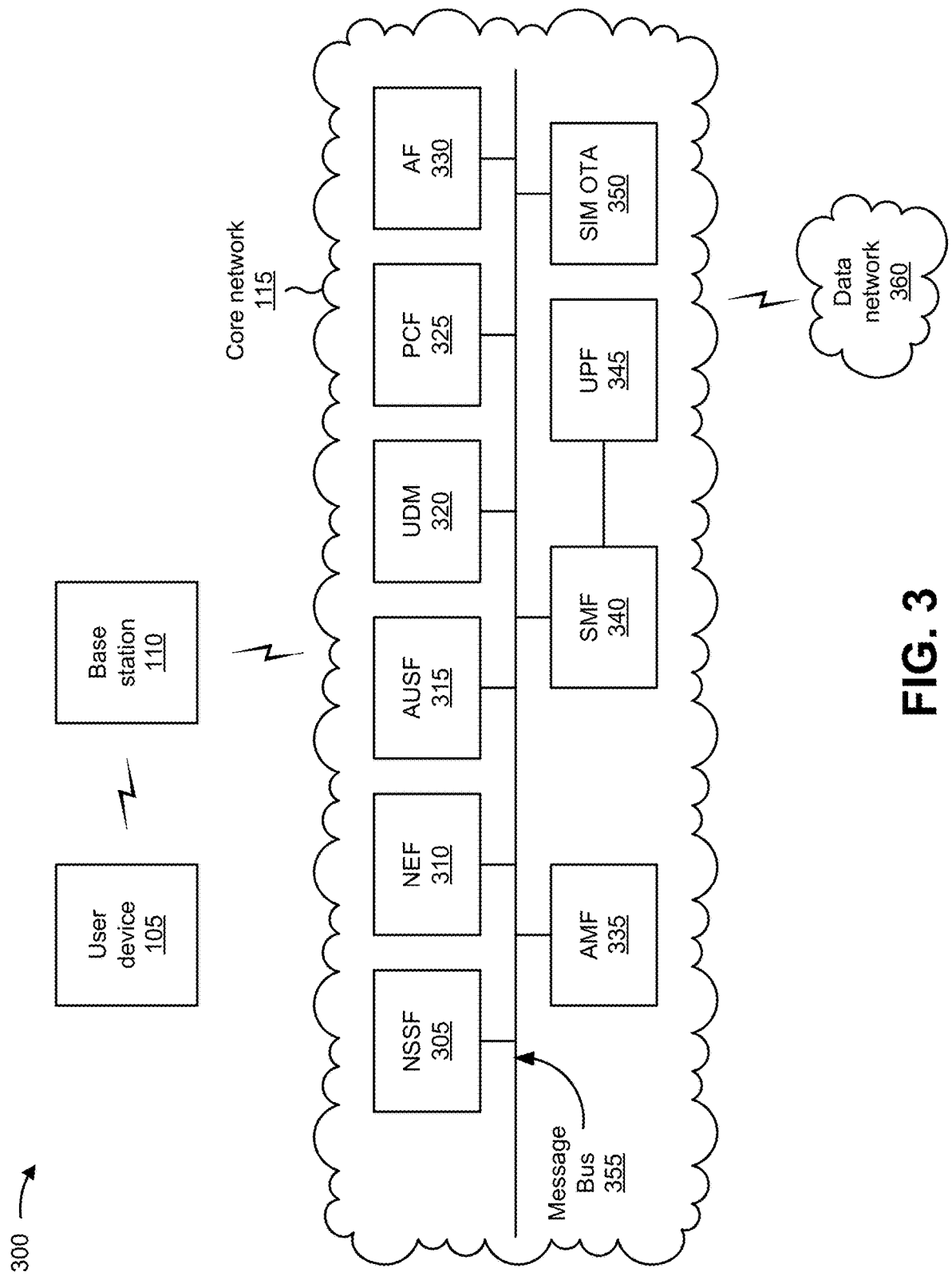
FIG. 3 is a diagram of an example environment in which systems and/or methods described herein may be implemented.

FIG. 3 is a diagram of an example environment 300 in which systems and/or methods described herein may be implemented. As shown in FIG. 3, example environment 300 may include user device 105, base station 110, core network 115, and a data network 360. Devices and/or networks of example environment 300 may interconnect via wired connections, wireless connections, or a combination of wired and wireless connections.

User device 105 includes one or more devices capable of receiving, generating, storing, processing, and/or providing information, such as information described herein. For example, user device 105 can include a mobile phone (e.g., a smart phone, a radiotelephone, and/or the like), a laptop computer, a tablet computer, a desktop computer, a handheld computer, a gaming device, a wearable communication device (e.g., a smart watch, a pair of smart glasses, and/or the like), a mobile hotspot device, a fixed wireless access device, customer premises equipment, an autonomous vehicle, or a similar type of device.

Base station 110 includes one or more devices capable of communicating with user device 105 using a cellular radio access technology (RAT). For example, base station 110 may include a base transceiver station, a radio base station, a node B, an eNodeB (eNB), a gNodeB (gNB), a base station subsystem, a cellular site, a cellular tower (e.g., a cell phone tower, a mobile phone tower, and/or the like), an access point, a transmit receive point (TRP), a radio access node, a macrocell base station, a microcell base station, a picocell base station, a femtocell base station, or a similar type of device. Base station 110 may transfer traffic between user device 105 (e.g., using a cellular RAT), other base stations 110 (e.g., using a wireless interface or a backhaul interface, such as a wired backhaul interface), and/or core network 115. Base station 110 may provide one or more cells that cover geographic areas. Some base stations 110 may be mobile base stations. Some base stations 110 may communicate using multiple RATs.

In some implementations, base station 110 may perform scheduling and/or resource management for user devices 105 covered by base station 110 (e.g., user devices 105 covered by a cell provided by base station 110). In some implementations, base station 110 may be controlled or coordinated by a network controller, which may perform load balancing, network-level configuration, and/or the like. The network controller may communicate with base station 110 via a wireless or wireline backhaul. In some implementations, base station 110 may include a network controller, a self-organizing network (SON) module or component, or a similar module or component. In other words, base station 110 may perform network control, scheduling, and/or network management functions (e.g., for other base stations 110 and/or for uplink, downlink, and/or sidelink communications of user devices 105 covered by the base station 110). In some implementations, base station 110 may include a central unit and multiple distributed units. The central unit may coordinate access control and communication with regard to the multiple distributed units. The multiple distributed units may provide user devices 105 and/or other base stations 110 with access to data network 360 via the core network.

In some implementations, core network 115 may include an example functional architecture in which systems and/or methods, described herein, may be implemented. For example, core network 115 may include an example architecture of a 5G next generation (NG) core network included in a 5G wireless telecommunications system. While the example architecture of core network 115 shown in FIG. 3 may be an example of a service-based architecture, in some implementations, core network 115 may be implemented as a reference-point architecture.

As shown in FIG. 3, core network 115 may include a number of functional elements. The functional elements may include, for example, a network slice selection function (NSSF) 305, a network exposure function (NEF) 310, an authentication server function (AUSF) 315, a unified data management (UDM) component 320, a policy control function (PCF) 325, an application function (AF) 330, an access and mobility management function (AMF) 335, a session management function (SMF) 340, a user plane function (UPF) 345, a subscriber identity module (SIM) over-the-air (OTA) device 350, and/or the like. These functional elements may be communicatively connected via a message bus 355. Each of the functional elements shown in FIG. 3 is implemented on one or more devices associated with a wireless telecommunications system. In some implementations, one or more of the functional elements may be implemented on physical devices, such as an access point, a base station, a gateway, and/or the like. In some implementations, one or more of the functional elements may be implemented on a computing device of a cloud computing environment.

NSSF 305 includes one or more devices that select network slice instances for user device 105. By providing network slicing, NSSF 305 allows an operator to deploy multiple substantially independent end-to-end networks potentially with the same infrastructure. In some implementations, each slice may be customized for different services.

NEF 310 includes one or more devices that support exposure of capabilities and/or events in the wireless telecommunications system to help other entities in the wireless telecommunications system discover network services.

AUSF 315 includes one or more devices that act as an authentication server and support the process of authenticating user devices 105 in the wireless telecommunications system.

UDM 320 includes one or more devices that store user data and profiles in the wireless telecommunications system. UDM 320 may be used for fixed access, mobile access, and/or the like, in core network 115.

PCF 325 includes one or more devices that provide a policy framework that incorporates network slicing, roaming, packet processing, mobility management, and/or the like.

AF 330 includes one or more devices that support application influence on traffic routing, access to NEF 310, policy control, and/or the like.

AMF 335 includes one or more devices that act as a termination point for non-access stratum (NAS) signaling, mobility management, and/or the like.

SMF 340 includes one or more devices that support the establishment, modification, and release of communications sessions in the wireless telecommunications system. For example, SMF 340 may configure traffic steering policies at UPF 345, enforce user device IP address allocation and policies, and/or the like.

UPF 345 includes one or more devices that serve as an anchor point for intraRAT and/or interRAT mobility. UPF 345 may apply rules to packets, such as rules pertaining to packet routing, traffic reporting, handling user plane QoS, and/or the like.

SIM OTA device 350 includes one or more devices, such as computing devices and/or server devices, that perform "OTA activation and/or OTA updates for a universal integrated circuit card (UICC), a SIM card, and/or the like installed in user device 105. For example, SIM OTA device 350 may authenticate the UICC via an access network provided by base station 110 and/or may provide an assigned telephone number to the UICC. In some implementations, SIM OTA device 350 may provide updates, new information, and/or the like to network slice selection assistance information (NSSAI) and/or user device route selection policy (URSP) configurations stored in the UICC of user device 105.

Message bus 355 represents a communication structure for communication among the functional elements. In other words, message bus 355 may permit communication between two or more functional elements.

Data network 360 includes one or more wired and/or wireless data networks. For example, data network 360 may include an IP Multimedia Subsystem (IMS), a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or the like, and/or a combination of these or other types of networks.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of example environment 300 may perform one or more functions described as being performed by another set of devices of example environment 300.

Figure 4:
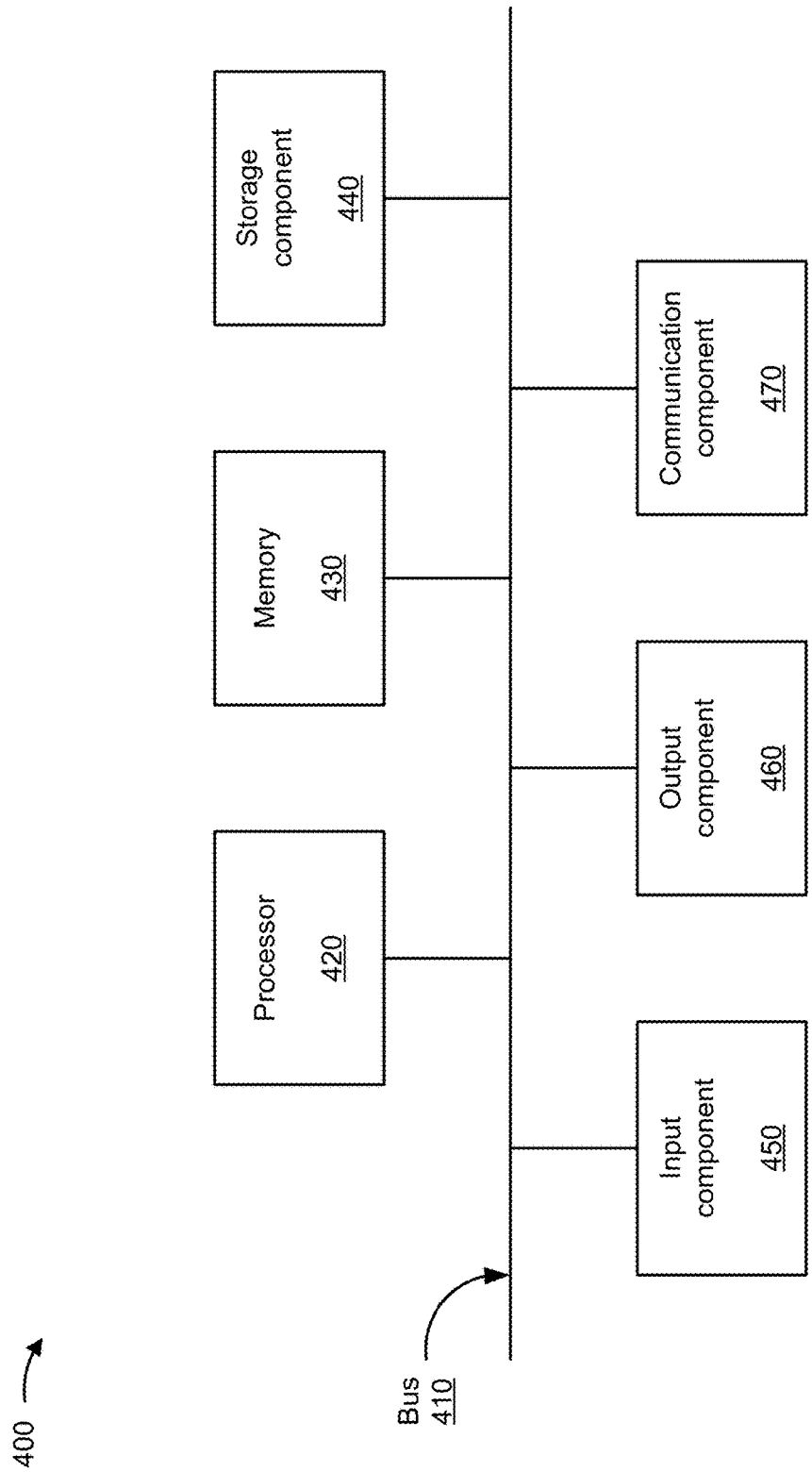
FIG. 4 is a diagram of example components of one or more devices of FIG. 3.

FIG. 4 is a diagram of example components of a device 400, which may correspond to user device 105, base station 110, NSSF 305, NEF 310, AUSF 315, UDM 320, PCF 325, AF 330, AMF 335, SMF 340, UPF 345, and/or SIM OTA device 350. In some implementations, user device 105, base station 110, NSSF 305, NEF 310, AUSF 315, UDM 320, PCF 325, AF 330, AMF 335, SMF 340, UPF 345, and/or SIM OTA device 350 may include one or more devices 400 and/or one or more components of device 400. As shown in FIG. 4, device 400 may include a bus 410, a processor 420, a memory 430, a storage component 440, an input component 450, an output component 460, and a communication component 470.

Bus 410 includes a component that enables wired and/or wireless communication among the components of device 400. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform a function. Memory 430 includes a random access memory), a read only memory, and/or another type of memory (e.g., a flash memory, a magnetic memory, and/or an optical memory).

Storage component 440 stores information and/or software related to the operation of device 400. For example, storage component 440 may include a hard disk drive, a magnetic disk drive, an optical disk drive, a solid state disk drive, a compact disc, a digital versatile disc, and/or another type of non-transitory computer-readable medium. Input component 450 enables device 400 to receive input, such as user input and/or sensed inputs. For example, input component 450 may include a touch screen, a keyboard, a keypad, a mouse, a button, a microphone, a switch, a sensor, a global positioning system component, an accelerometer, a gyroscope, an actuator, and/or the like. Output component 460 enables device 400 to provide output, such as via a display, a speaker, and/or one or more light-emitting diodes. Communication component 470 enables device 400 to communicate with other devices, such as via a wired connection and/or a wireless connection. For example, communication component 470 may include a receiver, a transmitter, a transceiver, a modem, a network interface card, an antenna, and/or the like.

Device 400 may perform one or more processes described herein. For example, a non-transitory computer-readable medium (e.g., memory 430 and/or storage component 440) may store a set of instructions (e.g., one or more instructions, code, software code, program code, and/or the like) for execution by processor 420. Processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

FIG. 5 is a flow chart of an example process 500 associated with systems and methods for determining an activation status for user devices. In some implementations, one or more process blocks of FIG. 5 may be performed by a user device (e.g., user device 105). In some implementations, one or more process blocks of FIG. 5 may be performed by another device or a group of devices separate from or including the user device, such as a base station (e.g., base station 110), an NSSF (e.g., NSSF 305), an AUSF (e.g., AUSF 315), a UDM (e.g., UDM 320), a SIM OTA (e.g., SIM OTA 350), and/or the like. Additionally, or alternatively, one or more process blocks of FIG. 5 may be performed by one or more components of a device 400, such as processor 420, memory 430, storage component 440, input component 450, output component 460, communication component 470, and/or the like.

As shown in FIG. 5, process 500 may include providing, to a network, a first request to attach to the network and a second request for management and administrative services associated with the network (block 510). For example, the user device may provide, to a network, a first request to attach to the network and a second request for management and administrative services associated with the network, as described above. In some implementations, the second request for the management and administrative services includes one of an administrative packet data network request when the user device is a 4G device, or an administrative data network name request when the user device is a 5G device.

As further shown in FIG. 5, process 500 may include receiving, from the network, a first response indicating whether the first request to attach to the network is granted (block 520). For example, the user device may receive, from the network, a first response indicating whether the first request to attach to the network is granted, as described above.

As further shown in FIG. 5, process 500 may include receiving, from the network, a second response indicating whether the second request for the management and administrative services is granted (block 530). For example, the user device may receive, from the network, a second response indicating whether the second request for the management and administrative services is granted, as described above. In some implementations, the user device may receive the second response when the first response indicates that the first request is granted.

As further shown in FIG. 5, process 500 may include providing, to the network, a third request for an activation status of the user device (block 540). For example, the user device may provide, to the network, a third request for an activation status of the user device, as described above. In some implementations, the user device may provide the third request for an activation status of the user device when the second response indicates that the second request for management and administrative services is granted.

As further shown in FIG. 5, process 500 may include receiving, from the network, a third response indicating the activation status requested by the third request (block 550). For example, the user device may receive, from the network, a third response indicating the activation status requested by the third request, as described above. In some implementations, the third request is provided to a SIM OTA device of the network, and the third response is received from the SIM OTA device. In some implementations, the third response indicates that the activation status of the user device is one of not activated, in progress, or activated.

As further shown in FIG. 5, process 500 may include updating, based on the third response, an activation flag indicating the activation status of the user device (block 560). For example, the user device may update, based on the third response, an activation flag indicating the activation status of the user device, as described above. In some implementations, process 500 includes updating the activation flag to indicate that the user device is not activated when the first response indicates that the first request to attach to the network is not granted. In some implementations, process 500 includes updating the activation flag to indicate that the user device is not activated when the second response indicates that the second request for the management and administrative services is not granted.

In some implementations, process 500 includes waiting for an updated response from the network for a time period and when the third response indicates that the activation status of the user device is in progress; determining whether the updated response is received from the network prior to expiration of the time period; and selectively: updating the activation flag based on the updated response when the updated response is received from the network prior to the expiration of the time period, or updating the activation flag to indicate that the user device is not activated when the updated response is not received from the network prior to the expiration of the time period.

As further shown in FIG. 5, process 500 may include providing a message indicating the activation status of the user device based on the activation flag (block 570). For example, the user device may provide, for display, a message indicating the activation status of the user device based on the activation flag, as described above.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
providing, by a subscriber identity module (SIM) of a user device and to a network, a first request to attach to the network and a second request for management and administrative services associated with the network;
receiving, by the SIM of the user device and from the network, a first response indicating whether the first request to attach to the network is granted;
receiving, by the SIM of the user device, from the network, and when the first response indicates that the first request is granted, a second response indicating whether the second request for the management and administrative services is granted;
providing, by the SIM of the user device, to the network and when the second response indicates that the second request for the management and administrative services is granted, a third request for an activation status of the user device;
receiving, by the SIM of the user device and from the network, a third response indicating the activation status of the user device requested by the third request;
updating, by the SIM of the user device and based on the third response, an activation flag indicating the activation status of the user device,
the activation status of the user device indicating that a SIM profile of the SIM of the user device is being programmed by the network; and
providing, by the SIM of the user device, a message indicating the activation status of the user device is in progress based on the activation flag.

2. The method of claim 1, further comprising:
waiting, by the user device for an updated response from the network for a time period and when the third response indicates that the activation status of the user device is in progress;
determining whether the updated response is received from the network prior to expiration of the time period; and
selectively:
updating the activation flag based on the updated response when the updated response is received from the network prior to the expiration of the time period, or
updating the activation flag to indicate that the user device is not activated when the updated response is not received from the network prior to the expiration of the time period.

3. The method of claim 1, further comprising:
updating the activation flag to indicate that the user device is not activated when the first response indicates that the first request to attach to the network is not granted.

4. The method of claim 1, further comprising:
updating the activation flag to indicate that the user device is not activated when the second response indicates that the second request for the management and administrative services is not granted.

5. The method of claim 1, wherein the second request for the management and administrative services includes one of:
an administrative packet data network request when the user device is a fourth generation device, or
an administrative data network name request when the user device is a fifth generation device.

6. The method of claim 1, wherein:
the third request is provided to a subscriber identity module (SIM) over-the-air (OTA) device of the network, and
the third response is received from the SIM OTA device.

7. The method of claim 1, wherein after the third response indicates that the activation status of the user device is in progress, updating the activation status of the user device to activated.

8. A subscriber identity module (SIM) of a device, the device comprising:
one or more processors configured to:
provide, to a network, a first request to attach to the network;
receive, from the network, a first response indicating whether the first request to attach to the network is granted;
provide, to the network, a second request for management and administrative services associated with the network;
receive, from the network and when the first response indicates that the first request is granted, a second response indicating whether the second request for the management and administrative services is granted;
provide, to the network and when the second response indicates that the second request for the management and administrative services is granted, a third request for an activation status of the device;
receive, from the network, a third response indicating the activation status of the device requested by the third request;
update, based on the third response, an activation flag to indicate that the activation status of the device is in progress,
the activation status of the device indicating that a SIM profile of the SIM of the device is being programmed by the network; and provide, based on the activation flag, a message indicating the activation status of the device is in progress.

9. The device of claim 8, wherein, when the device is incapable of communicating with a SIM over-the-air (OTA) device of the network, the device is prevented from providing the third request to the network and from receiving the third response from the network.

10. The device of claim 8, wherein the one or more processors, when providing the message indicating the activation status of the device, are configured to:
read the activation flag to determine that the activation status of the device is not active; and
generate the message indicating at least one of:
that the activation status of the device is not active, or
instructions indicating how to change the activation status of the device to active.

11. The device of claim 8, wherein the device includes one of:
a mobile telephone,
a machine-to-machine device,
an Internet of things device,
a device incapable of communicating with an Internet protocol multimedia subsystem, or
a device unassociated with a mobile subscriber integrated services digital network number.

12. The device of claim 8, wherein the one or more processors, when providing the message indicating the activation status of the device, are configured to:
read the activation flag to determine the activation status of the device;
generate the message indicating the activation status of the device based on reading the activation flag; and
provide the message indicating the activation status of the device based on generating the message.

13. The device of claim 8, wherein the one or more processors, when providing, to the network, the first request to attach to the network, are configured to:
  determine that the device is initially powering up or that the SIM is changed; and
  provide, to the network, the first request to attach to the network based on determining that the device is initially powering up or that the SIM is changed.

14. A non-transitory computer-readable medium storing instructions, the instructions comprising:
  one or more instructions that, when executed by one or more processors of a device comprising a subscriber identity module (SIM), cause the one or more processors of the device to:
  provide, to a network, a first request to attach to the network and a second request for management and administrative services associated with the network;
  receive, from the network, a first response indicating whether the first request to attach to the network is granted;
  update an activation flag included in a SIM profile of the SIM, that indicates an activation status of the device, to indicate that the SIM is not activated, is not being programmed by the network, and that the activation status of the device is not active when the first response indicates that the first request to attach to the network is not granted;
  receive from the network, and when the first response indicates that the first request is granted, a second response indicating whether the second request for the management and administrative services is granted;
  update the activation flag to indicate that the device is not activated when the second response indicates that the second request for the management and administrative services is not granted;
  provide, to the network and when the second response indicates that the second request for management and administrative services is granted, a third request for an activation status of the device;
  receive, from the network, a third response indicating the activation status of the device requested by the third request,
  wherein the activation status of the device indicating that the SIM profile of the SIM is being programmed by the network;
  update the activation flag based on the third response; and
  provide, for display, a message indicating the activation status of the device based on the activation flag.

15. The non-transitory computer-readable medium of claim 14, wherein the one or more instructions, when executed by the one or more processors, further cause the one or more processors to:
  wait for an updated response from the network for a time period and when the third response indicates that the activation status of the device is in progress;
  determine whether the updated response is received from the network prior to expiration of the time period; and
  selectively:
    update the activation flag based on the updated response when the updated response is received from the network prior to the expiration of the time period, or
    update the activation flag to indicate that the device is not activated when the updated response is not received from the network prior to the expiration of the time period.

16. The non-transitory computer-readable medium of claim 14, wherein the second request for the management and administrative services includes one of:
  an administrative packet data network request when the device is a fourth generation device, or
  an administrative data network name request when the device is a fifth generation device.

17. The non-transitory computer-readable medium of claim 14, wherein:
  the third request is provided to a SIM over-the-air (OTA) device of the network, and
  the third response is received from the SIM OTA device.

18. The non-transitory computer-readable medium of claim 14, wherein the one or more instructions, that cause the one or more processors to provide, for display, the message indicating the activation status of the device, cause the one or more processors to:
  read the activation flag to determine the activation status of the device;
  generate the message indicating the activation status of the device based on reading the activation flag; and
  provide, for display, the message indicating the activation status of the device based on generating the message.

19. The device of claim 8, wherein the device uses a SIM application of the SIM profile to determine real-time up to date information for the activation status of the device from the network.

20. The non-transitory computer-readable medium of claim 14, wherein the device uses a SIM application of the SIM profile to determine real-time up to date information for the activation status of the device from the network.

* * * * *